(12) United States Patent
Jayawardena et al.

(10) Patent No.: US 10,194,513 B2
(45) Date of Patent: *Jan. 29, 2019

(54) LIGHT FIXTURE AS AN ACCESS POINT IN A COMMUNICATION NETWORK

(71) Applicant: Eaton Intelligent Power Limited, Dublin (IE)

(72) Inventors: Adikaramge Asiri Jayawardena, Manlius, NY (US); Joseph Michael Manahan, Manlius, NY (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/933,765

(22) Filed: Mar. 23, 2018

(65) Prior Publication Data

US 2018/0213630 A1 Jul. 26, 2018

Related U.S. Application Data

(63) Continuation of application No. 14/854,788, filed on Sep. 15, 2015, now Pat. No. 9,930,758.

(51) Int. Cl.
*H05B 33/08* (2006.01)
*H05B 37/02* (2006.01)
*H04W 88/08* (2009.01)

(52) U.S. Cl.
CPC ........ *H05B 37/0272* (2013.01); *H04W 88/08* (2013.01); *H05B 33/0884* (2013.01)

(58) Field of Classification Search
None
See application file for complete search history.

(56) References Cited

U.S. PATENT DOCUMENTS

| 4,090,178 A | 5/1978 | Norris |
| 5,424,859 A | 6/1995 | Uehara et al. |
| 7,079,808 B2 | 7/2006 | Striemer |
| 7,162,258 B2 | 1/2007 | Beach et al. |
| 7,247,994 B2 | 7/2007 | Roach, Jr. |
| 8,125,403 B2 | 2/2012 | Hager |
| 8,346,191 B2 | 1/2013 | Robinson et al. |

(Continued)

FOREIGN PATENT DOCUMENTS

| DE | 102004003940 | 8/2005 |
| JP | 2009140644 | 6/2009 |

(Continued)

OTHER PUBLICATIONS

S. Surikov, International Search Report and Written Opinion issued in application No. PCT/US2016/051687, completion date Nov. 25, 2016, dated Dec. 8, 2016, 7 pages, Federal Institute of Industrial Property, Moscow, Russia.

*Primary Examiner* — Dedei K Hammond
(74) *Attorney, Agent, or Firm* — King & Spalding LLP (57) ABSTRACT

A light fixture is described herein. The light fixture can include a housing having at least one wall that forms a cavity. The light fixture can also include a controller configured to control and communicate with at least one sensor located outside the housing. The light fixture can further include at least one light fixture component coupled to the controller and disposed within the cavity of the housing, where the controller further controls the at least one light fixture component.

20 Claims, 7 Drawing Sheets

(56) References Cited

U.S. PATENT DOCUMENTS

| | | |
|---|---|---|
| 8,391,924 B2 | 3/2013 | Spivey |
| 8,445,826 B2 | 5/2013 | Verfuerth |
| 8,610,376 B2 | 12/2013 | Chemel et al. |
| 8,731,689 B2 | 5/2014 | Platner et al. |
| 9,930,758 B2 * | 3/2018 | Jayawardena ..... H05B 37/0272 |
| 2003/0039114 A1 | 2/2003 | Douzono et al. |
| 2005/0245254 A1 | 11/2005 | Hall |
| 2010/0188004 A1 | 7/2010 | Baggen et al. |
| 2011/0194280 A1 | 8/2011 | Ruffin, Jr. et al. |
| 2011/0309766 A1 | 12/2011 | Weng |
| 2012/0040606 A1 | 2/2012 | Verfuerth |
| 2012/0206050 A1 | 8/2012 | Spero |
| 2012/0218978 A1 | 8/2012 | Ishidoshiro |
| 2014/0035482 A1 | 2/2014 | Rains, Jr. et al. |
| 2014/0153923 A1 | 6/2014 | Casaccia et al. |
| 2014/0252961 A1 | 9/2014 | Ramer et al. |
| 2014/0312772 A1 | 10/2014 | Donegan et al. |
| 2016/0270179 A1 | 9/2016 | Ryhorchuk et al. |

FOREIGN PATENT DOCUMENTS

| | | |
|---|---|---|
| JP | 2009177519 | 8/2009 |
| WO | 2011125845 | 10/2011 |

* cited by examiner

LIGHT FIXTURE AS AN ACCESS POINT IN A COMMUNICATION NETWORK

TECHNICAL FIELD

This application is a continuation application of and claims priority under 35 U.S.C. § 120 to U.S. patent application Ser. No. 14/854,788, titled "Light Fixture As an Access Point in a Communication Network" and filed on Sep. 15, 2015, the entire contents of which are hereby incorporated herein by reference.

TECHNICAL FIELD

The present disclosure relates generally to light fixtures in a wireless network, and more particularly to systems, methods, and devices for light fixtures used as an access point in a communication network.

BACKGROUND

In wireless networks, there are nodes and one or more access points that communicate with each other. The node sends and receives data through an access point, and the access point sends the data to and receives other data from a controller within the wireless network. Data is sent and received within the communication network using a communication protocol.

SUMMARY

In general, in one aspect, the disclosure relates to a light fixture. The light fixture can include a housing comprising at least one wall that forms a cavity. The light fixture can also include a controller configured to control and communicate with at least one sensor located outside the housing. The light fixture can further include at least one light fixture component coupled to the controller and disposed within the cavity of the housing, where the controller further controls the at least one light fixture component.

In another aspect, the disclosure can generally relate to a controller of a light fixture. The controller can include memory comprising a plurality of instructions. The controller can also include a control engine coupled to the memory, where the controller is configured to send and receive communication signals with at least one sensor based on the plurality of instructions, where the at least one sensor is external to the light fixture. The controller can further include a communication module coupled to the control engine, where the communication module is configured to transmit the communication signals between the control engine and the at least one sensor. The control module can transmit the communication signals using at least one time-synchronized communication protocol.

In yet another aspect, the disclosure can generally relate to an electrical system. The electrical system can include at least one sensor, and a light fixture communicably coupled to the at least one sensor. The light fixture of the electrical system can include a housing comprising at least one wall that forms a cavity. The light fixture of the electrical system can also include a controller that controls and communicates with the at least one sensor. The light fixture of the electrical system can further include at least one light fixture component coupled to the controller and disposed within the cavity of the housing, where the controller further controls the at least one light fixture component. The at least one sensor can be located outside the housing of the light fixture.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

In general, example embodiments provide systems, methods, and devices for light fixtures used as an access point in a communication network. Example light fixtures used as an access point in a communication network provide a number of benefits. Such benefits can include, but are not limited to, increased flexibility of the arrangement of sensors in a communication network, reduced power consumption, improved communication efficiency, ease of maintenance, and compliance with industry standards that apply to electrical enclosures located in certain environments.

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with example light fixtures used as an access point in a communication network. Examples of a user may include, but are not limited to, an engineer, an electrician, an instrumentation and controls technician, a mechanic, an operator, a consultant, a contractor, and a manufacturer's representative.

The example light fixtures used as an access point in a communication network (or components thereof, including controllers) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures used as an access point in a communication network, or portions thereof, described herein can be made from a single piece (as from a mold, injection mold, die cast, or extrusion process). In addition, or in the alternative, example light fixtures used as an access point in a communication network can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of light fixtures used as an access point in a communication network, one or more of the components shown may be omitted, repeated, and/or substituted. Accordingly, example embodiments of light fixtures used as an access point in a communication network should not be considered limited to the specific arrangements of components shown in any of the figures. For example, features shown in one or more figures or described with respect to one embodiment can be applied to another embodiment associated with a different figure or description.

As defined herein, an electrical enclosure is any type of cabinet or housing inside of which is disposed electrical and/or electronic equipment. Such electrical and/or electronic equipment can include, but is not limited to, a control module, a hardware processor, a power module (e.g., a battery, a driver, a ballast), a sensor module, a safety barrier, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

In certain example embodiments, light fixtures used as an access point in a communication network are subject to meeting certain standards and/or requirements. For example, the National Electric Code (NEC), the National Electrical Manufacturers Association (NEMA), the International Electrotechnical Commission (IEC), the Federal Communication Commission (FCC), and the Institute of Electrical and Electronics Engineers (IEEE) set standards as to electrical enclosures, wiring, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Example embodiments of light fixtures used as an access point in a communication network will be described more fully hereinafter with reference to the accompanying drawings, in which example embodiments of light fixtures used as an access point in a communication network are shown. Light fixtures used as an access point in a communication network may, however, be embodied in many different forms and should not be construed as limited to the example embodiments set forth herein. Rather, these example embodiments are provided so that this disclosure will be thorough and complete, and will fully convey the scope of light fixtures used as an access point in a communication network to those of ordinary skill in the art. Like, but not necessarily the same, elements (also sometimes called components) in the various figures are denoted by like reference numerals for consistency.

Terms such as "first", "second", and "within" are used merely to distinguish one component (or part of a component or state of a component) from another. Such terms are not meant to denote a preference or a particular orientation, and are not meant to limit embodiments of light fixtures used as an access point in a communication network. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1:
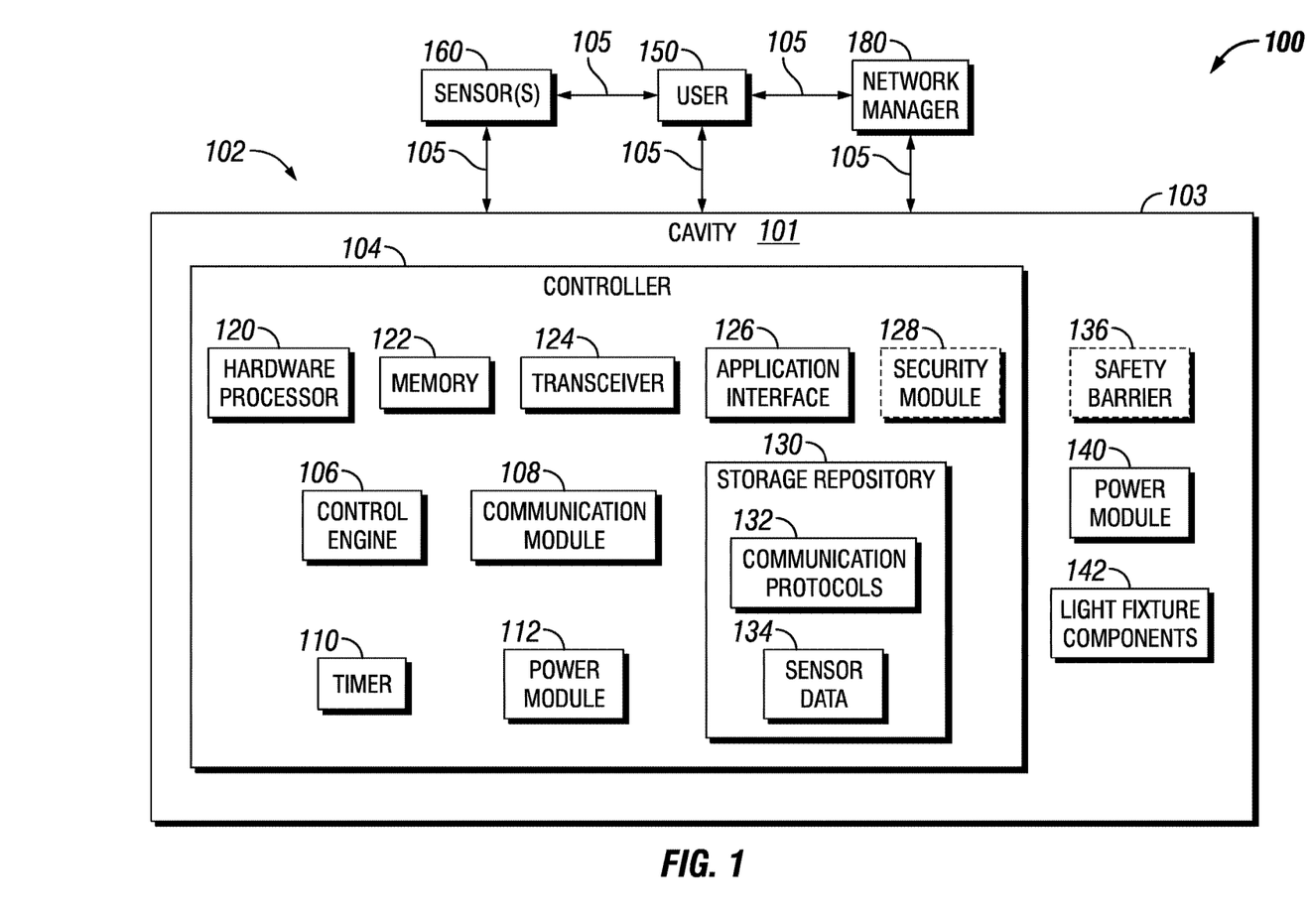
FIG. 1 shows a system diagram of a lighting system that includes a light fixture in accordance with certain example embodiments.

FIG. 1 shows a system diagram of a lighting system 100 that includes a light fixture 102 in accordance with certain example embodiments. The lighting system 100 can include one or more sensors 160, a user 150, a network manager 180, and a light fixture 102. The light fixture 102 can include a controller 104, a power module 140, a number of light fixture components 142, and an optional safety barrier 136. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

The user 150 is the same as a user defined above. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensors 160. Interaction between the user 150 and the light fixture 102, the network manager 180, and the sensors 160 is conducted using communication links 105. Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of the light fixture 102 and to a sensor 160. The communication link 105 can transmit signals (e.g., power signals, communication signals, control signals, data) between the light fixture 102 and the user 150, the network manager 180, and/or one or more of the sensors 160.

The network manager 180 is a device or component that controls all or a portion of a communication network that includes the controller 104 of the light fixture 102 and the sensors 160 that are communicably coupled to the controller 104. The network manager 180 can be substantially similar to the controller 104. Alternatively, the network manager 180 can include one or more of a number of features in addition to, or altered from, the features of the controller 104 described below.

The one or more sensors 160 can be any type of sensing device that measure one or more parameters. Examples of types of sensors 160 can include, but are not limited to, a passive infrared sensor, a photocell, a pressure sensor, an air flow monitor, a gas detector, and a resistance temperature detector. A parameter that can be measured by a sensor 160 can include, but is not limited to, motion, an amount of ambient light, occupancy of a space, and an ambient temperature. In some cases, the parameter or parameters measured by a sensor 160 can be used to operate one or more light fixture components 142 of the light fixture 102. Each sensor 160 can use one or more of a number of communication protocols.

In certain example embodiments, a sensor 160 can include a battery that is used to provide power, at least in part, to some or all of the rest of the sensor 160. When the system 100 (or at least a sensor 160) is located in a hazardous environment, the sensor 160 can be intrinsically safe. As used herein, the term "intrinsically safe" refers to a device (e.g., a sensor described herein) that is placed in a hazardous environment. To be intrinsically safe, the device uses a limited amount of electrical energy so that sparks cannot occur from a short circuit or failures that can cause an explosive atmosphere found in hazardous environments to ignite. A safety barrier is commonly used with an intrinsically safe device, where the safety barrier limits the amount of power delivered to the sensor or other device to reduce the risk of explosion, fire, or other adverse condition that can be caused by high amounts of power in the hazardous environment.

The user 150, the network manager 180, and/or the sensors 160 can interact with the controller 104 of the light fixture 102 using the application interface 126 in accordance with one or more example embodiments. Specifically, the application interface 126 of the controller 104 receives data (e.g., information, communications, instructions) from and sends data (e.g., information, communications, instructions) to the user 150, the network manager 180, and/or each sensor 160. The user 150, the network manager 180, and/or each sensor 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, and/or the sensors 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). For example, if the light fixture 102 is located in an explosive environment, the housing 103 can be explosion-proof. According to applicable industry standards, an explosion-proof enclosure is an enclosure that is configured to contain an explosion that originates inside, or can propagate through, the enclosure.

Continuing with this example, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface.

The housing 103 of the light fixture 102 can be used to house one or more components of the light fixture 102, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power module 140, and the light fixture components 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more sensors 160 within the system 100. In one or more example embodiments, the storage repository 130 stores one or more communication protocols 132 and sensor data 134. The communication protocols 132 can be any of a number of protocols that are used to send and/or receive data between the controller 104 and the user 150, the network manager 180, and one or more sensors 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

Sensor data 134 can be any data associated with each sensor 160 that is communicably coupled to the controller 104. Such data can include, but is not limited to, a manufacturer of the sensor 160, a model number of the sensor 160, communication capability of a sensor 160, power requirements of a sensor 160, and measurements taken by the sensor 160. Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132 and/or the sensor data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, and the sensors 160 in the system 100. More specifically, the control engine 106 sends information to and/or receives information from the storage repository 130 in order to communicate with the user 150, the network manager 180, and the sensors 160. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can put the communication module 108 in "sleep" mode when there are no communications between the controller 104 and another component (e.g., a sensor 160, the user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the power module 112 to send power signals and/or stop sending power signals to one or more sensors 160 in the system 100. This example provides another instance where the control engine 106 can conserve power used by the controller 104 and other components of the system 100.

The control engine 106 can provide control, communication, and/or other similar signals to the user 150, the network manager 180, and one or more of the sensors 160. Similarly, the control engine 106 can receive control, communication, and/or other similar signals from the user 150, the network manager 180, and one or more of the sensors 160. The control engine 106 can control each sensor 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power module 140) of the light fixture 102. For example, if the power module 140 of the light fixture 102 operates under IEC Standard 62386, then the power module 140 can include a digital addressable lighting interface (DALI). In such a case, the control engine 106 can also include a DALI to enable communication with the power module 140 within the light fixture 102. Such an interface can operate in conjunction with, or independently of, the communication protocols 132 used to communicate between the controller 104 and the user 150, the network manager 180, and the sensors 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I²C), and a pulse width modulator (PWM).

By using the control engine 106 as described herein, the controller 104 can serve as an access point in the communication network (e.g., using the communication links 105) of the system 100. In other words, while at least a portion (e.g., the control engine 106) of the controller 104 is always on, the remainder of the controller 104 and the sensors 160 can be in sleep mode when they are not being used. In addition, the controller 104 can control the sensors 160 rather than merely collect data measured by the sensors 160, which allows the controller 104 to serve as an access point rather than a node in the communication network of the system 100.

The communication network of the system 100 can have any type of network architecture. For example, the communication network of the system 100 can be a mesh network. As another example, the communication network of the system 100 can be a star network. In any case, the controller 104 serves as an access point, which conserves power. When the controller 104 includes an energy storage device (e.g., a battery as part of the power module 112), even more power can be conserved in the operation of the system 100. In addition, using the time-synchronized communication protocols 132 described herein, the data transferred between the controller 104 and the user 150, the network manager 180, and the sensors 160 is secure.

The communication module 108 of the controller 104 determines and implements the communication protocol (e.g., from the communication protocols 132 of the storage repository 130) that is used when the control engine 106 communicates with (e.g., sends signals to, receives signals from) the user 150, the network manager 180, and/or one or more of the sensors 160. In some cases, the communication module 108 accesses the sensor data 134 to determine which communication protocol is within the capability of the recipient of a communication sent by the control engine 106. In addition, the communication module 108 can interpret the communication protocol of a communication received by the controller 104 so that the control engine 106 can interpret the communication.

The communication module 108 can send data (e.g., communication protocols 132, sensor data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power module 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 104 and/or by the power module 140. In addition, or in the alternative, the power module 112 can be a source of power in itself to provide signals to the other components of the controller 104 and/or the power module 140. For example, the power module 112 can be a battery. As another example, the power module 112 can be a localized photovoltaic power system.

In certain example embodiments, the power module 112 of the controller 104 can also provide power and/or control signals, directly or indirectly, to one or more of the sensors 160. In such a case, the control engine 106 can direct the power generated by the power module 112 to the sensors 160 and/or the power module 140 of the light fixture 102. In this way, power can be conserved by sending power to the sensors 160 and/or the power module 140 of the light fixture 102 when those devices need power, as determined by the control engine 106.

The hardware processor 120 of the controller 104 executes software in accordance with one or more example embodiments. Specifically, the hardware processor 120 can execute software on the control engine 106 or any other portion of the controller 104, as well as software used by the user 150, the network manager 180, and/or one or more of the sensors 160. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA). Using FPGAs and/or other similar devices known in the art allows the controller 104 (or portions thereof) to be programmable and function according to certain logic rules and thresholds without the use of a hardware processor.

The transceiver 124 of the controller 104 can send and/or receive control and/or communication signals. Specifically, the transceiver 124 can be used to transfer data between the controller 104 and the user 150, the network manager 180, and/or the sensors 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, and/or the sensors 160.

When the transceiver 124 uses wireless technology, any type of wireless technology can be used by the transceiver 124 in sending and receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, and/or the sensors 160 can be part of the sensor data 134 (or similar areas) of the storage repository 130.

Optionally, in one or more example embodiments, the security module 128 secures interactions between the controller 104, the user 150, the network manager 180, and/or the sensors 160. More specifically, the security module 128 authenticates communication from software based on security keys verifying the identity of the source of the communication. For example, user software may be associated with a security key enabling the software of the user 150 to interact with the controller 104 and/or the sensors 160. Further, the security module 128 can restrict receipt of information, requests for information, and/or access to information in some example embodiments.

As mentioned above, aside from the controller 104 and its components, the light fixture 102 can include a power module 140, one or more light fixture components 142, and an optional safety barrier 136. The light fixture components 142 of the light fixture 102 are devices and/or components typically found in a light fixture to allow the light fixture 102 to operate. A light fixture component 142 can be electrical, electronic, mechanical, or any combination thereof. The light fixture 102 can have one or more of any number and/or type of light fixture components 142. Examples of such light fixture components 142 can include, but are not limited to, a control module, a light source, a light engine, a heat sink, an electrical conductor or electrical cable, a terminal block, a lens, a diffuser, a reflector, an air moving device, a baffle, a dimmer, and a circuit board.

The power module 140 of the light fixture 102 provides power to one or more of the light fixture components 142. The power module 140 can be substantially the same as, or different than, the power module 112 of the controller 104. The power module 140 can include one or more of a number of single or multiple discrete components (e.g., transistor, diode, resistor), and/or a microprocessor. The power module 140 may include a printed circuit board, upon which the microprocessor and/or one or more discrete components are positioned.

The power module 140 can include one or more components (e.g., a transformer, a diode bridge, an inverter, a converter) that receives power (for example, through an electrical cable) from the power module 112 of the controller 104 and generates power of a type (e.g., alternating current, direct current) and level (e.g., 12V, 24V, 120V) that can be used by the light fixture components 142. In addition, or in the alternative, the power module 140 can receive power from a source external to the light fixture 102. In addition, or in the alternative, the power module 140 can be a source of power in itself. For example, the power module 140 can be a battery, a localized photovoltaic power system, or some other source of independent power.

The optional safety barrier 136 can provide protection (e.g., overvoltage protection, overcurrent protection) for one or more components of the light fixture 102 when the light fixture 102 is located in a hazardous environment. For example, the safety barrier 136 can limit the amount of power delivered to the power module 112 of the controller 104 to reduce the risk of explosion, fire, or other adverse condition that can be caused by high amounts of power in the hazardous environment. The safety barrier 136 can often be a required component when the light fixture 102 is located in a hazardous environment. The safety barrier 136 can include one or more of a number of single or multiple discrete components (e.g., capacitor, inductor, transistor, diode, resistor, fuse), and/or a microprocessor.

As stated above, the light fixture 102 can be placed in any of a number of environments. In such a case, the housing 102 of the light fixture 102 can be configured to comply with applicable standards for any of a number of environments. For example, the light fixture 102 can be rated as a Division 1 or a Division 2 enclosure under NEC standards. Similarly, any of the sensors 160 or other devices communicably coupled to the light fixture 102 can be configured to comply with applicable standards for any of a number of environments. For example, a sensor 160 can be rated as a Division 1 or a Division 2 enclosure under NEC standards.

Figure 2:
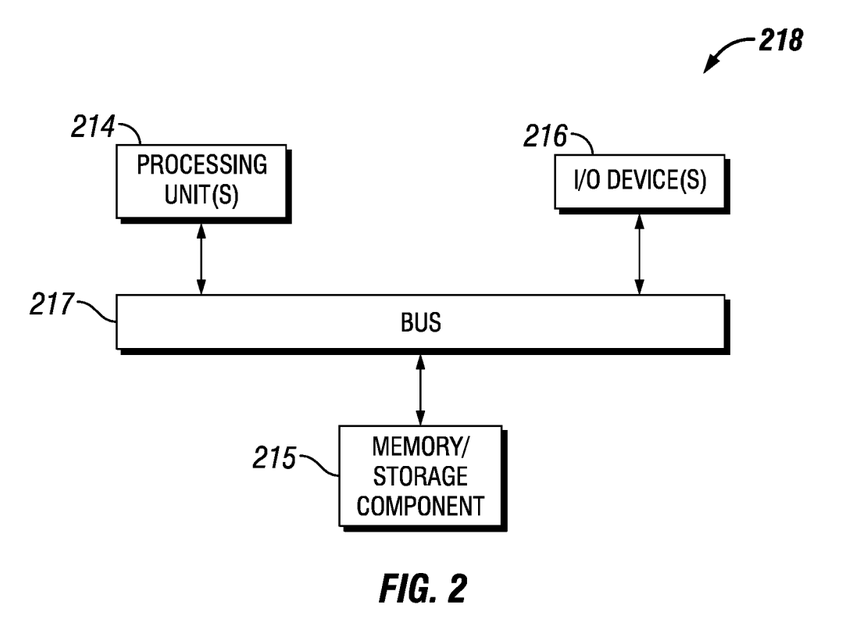
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
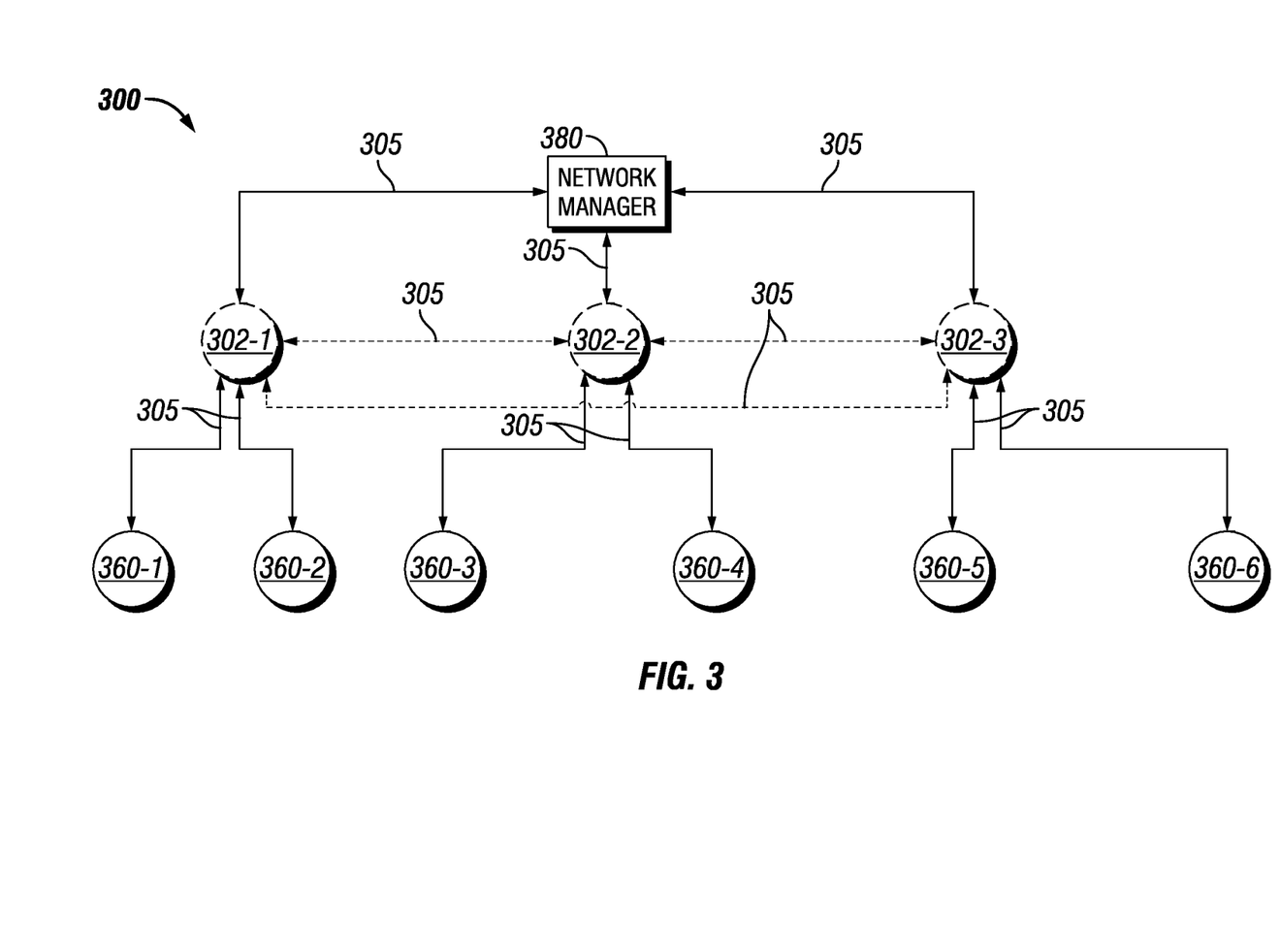
FIG. 3 shows a system diagram of architecture for a network communication system in accordance with certain example embodiments.

FIG. 3 shows a system diagram of architecture for a network communication system 300 in accordance with certain example embodiments. Referring to FIGS. 1-3, the system 300 of FIG. 3 includes a network manager 380 that is communicably coupled, using communication links 305, to three different light fixtures: Light fixture A 302-1, light fixture B 302-2, and light fixture C 302-3. In certain example embodiments, a light fixture can be referred to as a "hopper". Each light fixture in the system 300 can be configured to be communicably coupled, using communication links 305) to one or more other light fixtures in the system 300.

The system 300 also includes a total of six sensors: Sensor A 360-1, sensor B 360-2, sensor C 360-3, sensor D 360-4, sensor E 360-5, and sensor F 360-6. Sensor A 360-1 and sensor B 360-2 are communicably coupled to light fixture A 302-1 using communication links 305. Sensor C 360-3 and sensor D 360-4 are communicably coupled to light fixture B 302-2 using communication links 305. Sensor E 360-5 and sensor F 360-6 are communicably coupled to light fixture C 302-3 using communication links 305. One of more of the sensors 360 of FIG. 3 can be powered, at least in part, by a battery. A sensor 360 that is directly communicably coupled to a light fixture 302 can measure one or more parameters that effect the operation of the light fixture 302 or that have no effect on the operation of the light fixture 302.

In other words, network manager 380 in the system 300 of FIG. 3 has no direct communication with any sensors in the system 300. In certain example embodiments, the network manager 380 is unaware of the existence of the sensors 360 or any other devices to which the network manager 380 is not directly communicably coupled. In this way, since the number of devices to which the network manager 380 can be directly communicably coupled is limited (e.g., the network manager 380 has only 250 channels under a wireless HART communication protocol), the system 300 can be expanded by allowing one or more example light fixtures 302 to assume direct communication and control of sensors 360 and other remote devices.

Figure 4:
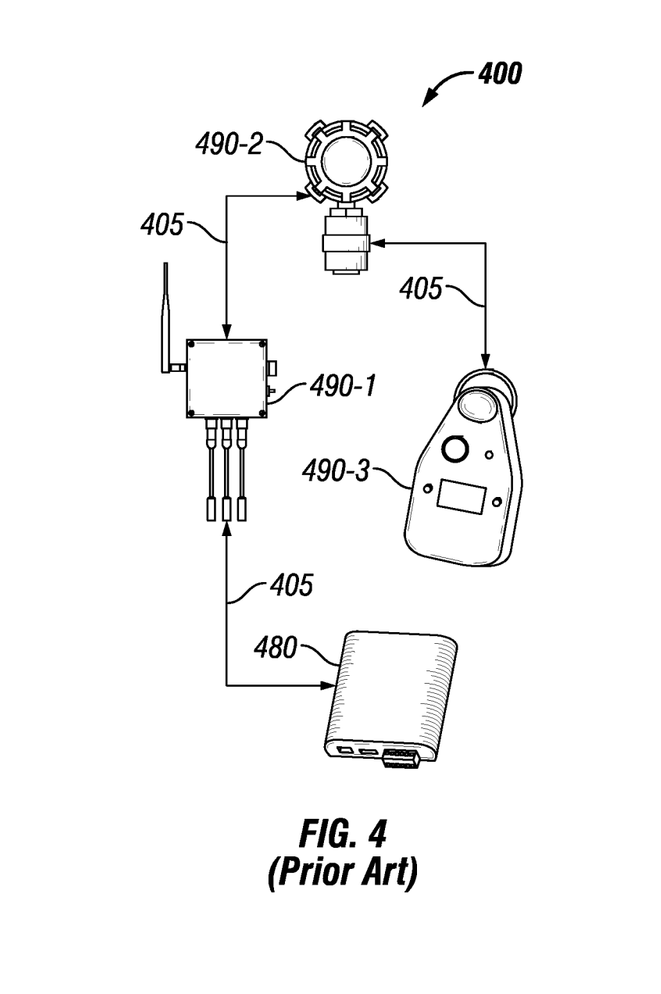
FIGS. 4 and 5 show system diagrams of a network communication system currently known in the art.
Figure 5:
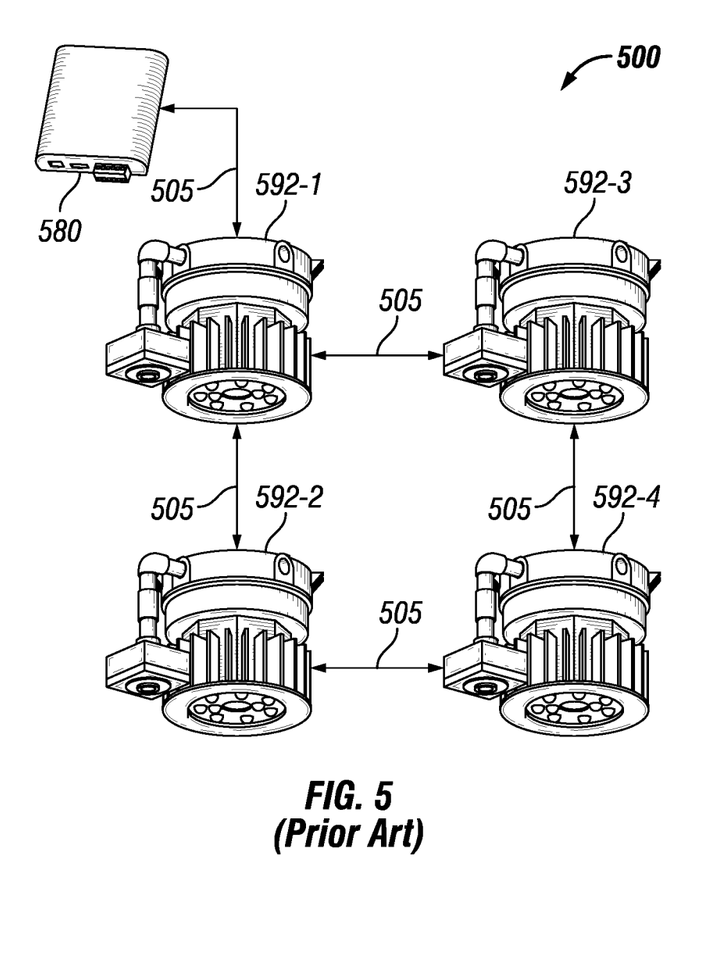

This differs from network communication systems current known in the art, examples of which are shown in FIGS. 4 and 5. Specifically, FIG. 4 shows a network communication system 400 currently known in the art, and FIG. 5 shows a network communication system 500 currently known in the art. Referring to FIGS. 1-5, the system 400 of FIG. 4 includes a network manager 480 communicably coupled, using communication links 405, to sensor A 490-1. Sensor A 490-1 is communicably coupled, using communication links 405, to sensor B 490-2. Sensor B 490-2 is communicably coupled, using communication links 405, to sensor C 490-3.

In this case, the sensors (sensor A 460-1, sensor B 460-2, sensor C 460-3) of FIG. 4 are substantially the same as the example sensors (e.g., sensor 160) described herein, except that the sensors of FIG. 4 include one or more of a number of components (such as a controller) that allows the sensor to conduct two-way communication with one or more devices in the system 400. The system 400 of FIG. 4 does not include a light fixture. Instead, sensor A 490-1 acts as a relay for any communication with the network manager 480, and sensor B 490-2 acts as a relay for any communication with the network manager 480 that is not intended solely for sensor A 490-1. As a result, sensor A 490-1 is "on" essentially all the time, consuming a significantly greater amount of power relative to the amount of power consumed by sensors in example embodiments. Similarly, but to a lesser extent, sensor B 490-2 consumes a greater amount of power relative to the power consumed by sensors in example embodiments.

The system 500 of FIG. 5 includes a network manager 580 communicably coupled, using communication links 505, to light source A 592-1. Light source A 592-1 is communicably coupled to light source B 592-2 and light source C 592-3, and light source B 592-2 and light source C 592-3 are communicably coupled, using communication links 505, to light source D 592-4. Each light source 592 in FIG. 5 is substantially similar to an example light fixture (e.g., light fixture 102) described herein, except that the light sources in the system 500 of FIG. 5 do not have a controller (e.g., controller 104). Thus, since none of the light fixtures of FIG. 5 include a controller, a light source (e.g., light source A 592-1) in FIG. 5 merely acts as a relay for any communication associated with the network manager 480. As a result, each of the light sources in the system 500 of FIG. 5 consumes a significantly greater amount of power relative to the power consumed by the light sources of systems in example embodiments. Further, there are no sensors in system 500.

Figure 6:
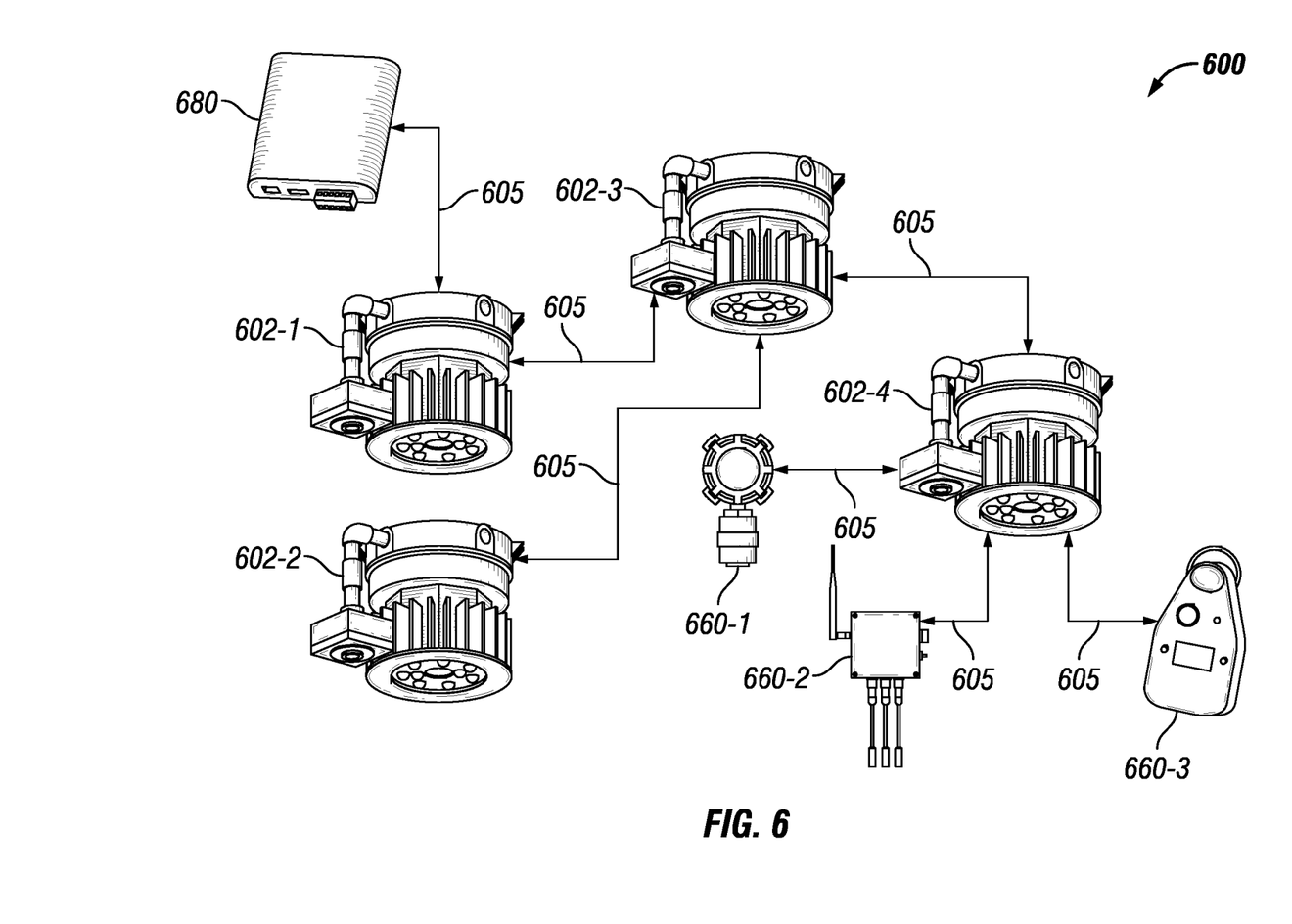
FIGS. 6 and 7 show a system diagram of a network communication system in accordance with certain example embodiments.
Figure 7:
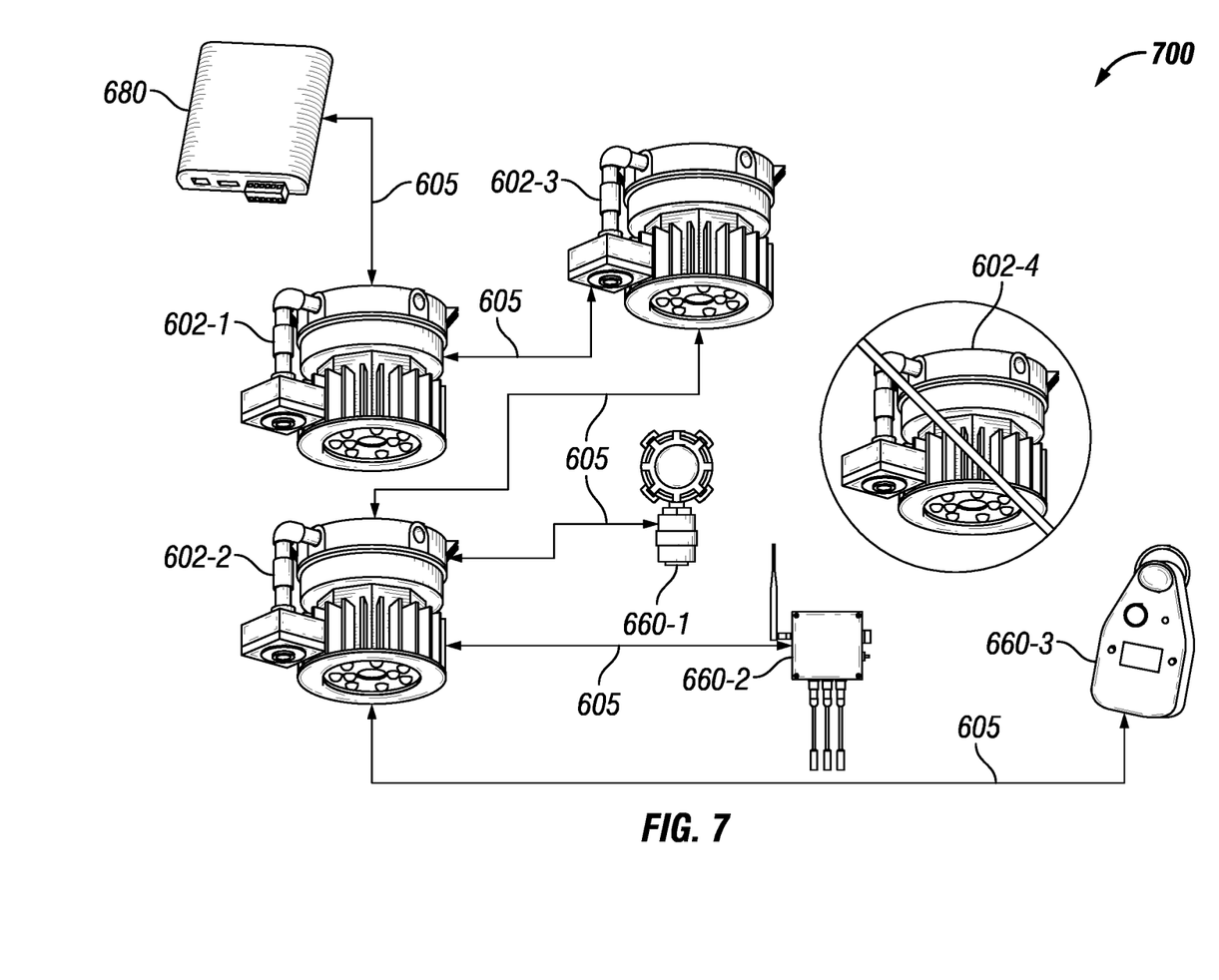

FIGS. 6 and 7 show a system diagram of a network communication system in accordance with certain example embodiments. Specifically, FIG. 6 shows the network communication system 600 when all components in the system 600 are working properly (under normal operating conditions). FIG. 7 shows a system 700 with all of the components of the system 600 of FIG. 6, except where one of the components is not functioning properly. Referring to FIGS. 1-7, the system 600 of FIG. 6 includes a network manager 680 communicably coupled, using communication links 505, to light fixture A 602-1.

Light fixture A 602-1 is communicably coupled, using communication links 605, to light fixture C 602-3. Light fixture C 602-3 is communicably coupled, using communication links 605, to light fixture B 602-2 and light fixture D 602-4. Light fixture D 602-4 is communicably coupled, using communication links 605, to sensor A 660-1, sensor B 660-2, and sensor C 660-3. While not shown in FIG. 6, light fixture A 602-1, light fixture B 602-2, and light fixture C 602-3 can each be communicably coupled to one or more other sensors during normal operating conditions.

In this example, a number of different devices conserve power. For example, sensor A 660-1, sensor B 660-2, and sensor C 660-3 are only active ("on") when a particular sensor is called upon by a light fixture (in this case, light fixture D 602-4). Thus, if a sensor is powered by a battery, the life of the battery can be significantly longer than the life of a battery in a sensor (e.g., sensor A 490-1) used in systems currently known in the art. In the system 600, the network manager 680 communicates with a single light fixture (in this case, light fixture A 602-1) for the signal to be received by a sensor (e.g., sensor B 660-2).

As a result, the network manager 680 can communicate with a larger number of devices in the system 600 because many of the devices in the system 600 can be indirectly, as opposed to directly, communicably coupled to the network manager 680. In other words, a light fixture (e.g., light fixture C 602-3), using an example controller, can control a subnetwork of the system 600. As a result, the network manager 680 only needs to send a signal to have a function (read a temperature, detect an amount of light) performed in the system 600. The various light fixtures of the system 600, each acting with an example controller, determines which sensor should perform the function and commands the sensor to perform the function on demand.

The example system 600 of FIG. 6 also is capable of automated reconfiguration in the event of a loss of a light fixture of other component of the system. For example, the system 700 of FIG. 7 is substantially the same as the system 600 of FIG. 6, except that light fixture D 602-4 is out of service. As a result, the sensors (in this case, sensor A 660-1, sensor B 660-2, and sensor C 660-3) associated with light fixture D 602-4 in the system 600 of FIG. 6, need to be controlled by and in communication with another light fixture. In this case, when light fixture D 602-4 becomes out of service (e.g., loses power, malfunctions), light fixture B 602-2 is instructed to take control of and communicate with sensor A 660-1, sensor B 660-2, and sensor C 660-3.

When light fixture 602-4 is out of service, light fixture B 602-2 can be instructed to communicate with and control sensor A 660-1, sensor B 660-2, and sensor C 660-3 in one or more of a number of ways. For example, the light fixture B 602-2 can receive an instruction, directly or indirectly, from the network manager 680 to communicate with and control sensor A 660-1, sensor B 660-2, and sensor C 660-3. As another example, when light fixture D 602-4 becomes out of service, a signal is automatically generated to instruct the controller of light fixture B 602-2 to establish communication and control with sensor A 660-1, sensor B 660-2, and sensor C 660-3. As yet another example, when one of the sensors (e.g., sensor A 660-1) loses communication with the light fixture D 602-4, the sensor can send a signal to the light fixture (in this case, light fixture B 602-2) in closest proximity to the sensor.

The selection of light fixture B 602-2 to assume communication and control of sensor A 660-1, sensor B 660-2, and sensor C 660-3 when light fixture D 602-4 becomes out of service can be based on one or more of a number of factors. Such factors can include, but are not limited to, proximity to sensor A 660-1, sensor B 660-2, and sensor C 660-3 relative the other light fixtures in the network 700, number of sensors already under control of light fixture B 602-2 relative to the other active light fixtures in the network 600, the configuration of the communication links 605, and a default setting. In certain example embodiments, when light fixture D 602-4 returns to service, the configuration of the components can return to the system 600 shown in FIG. 6 automatically, by instruction from a user, or based on some other factor or event.

Figure 8:
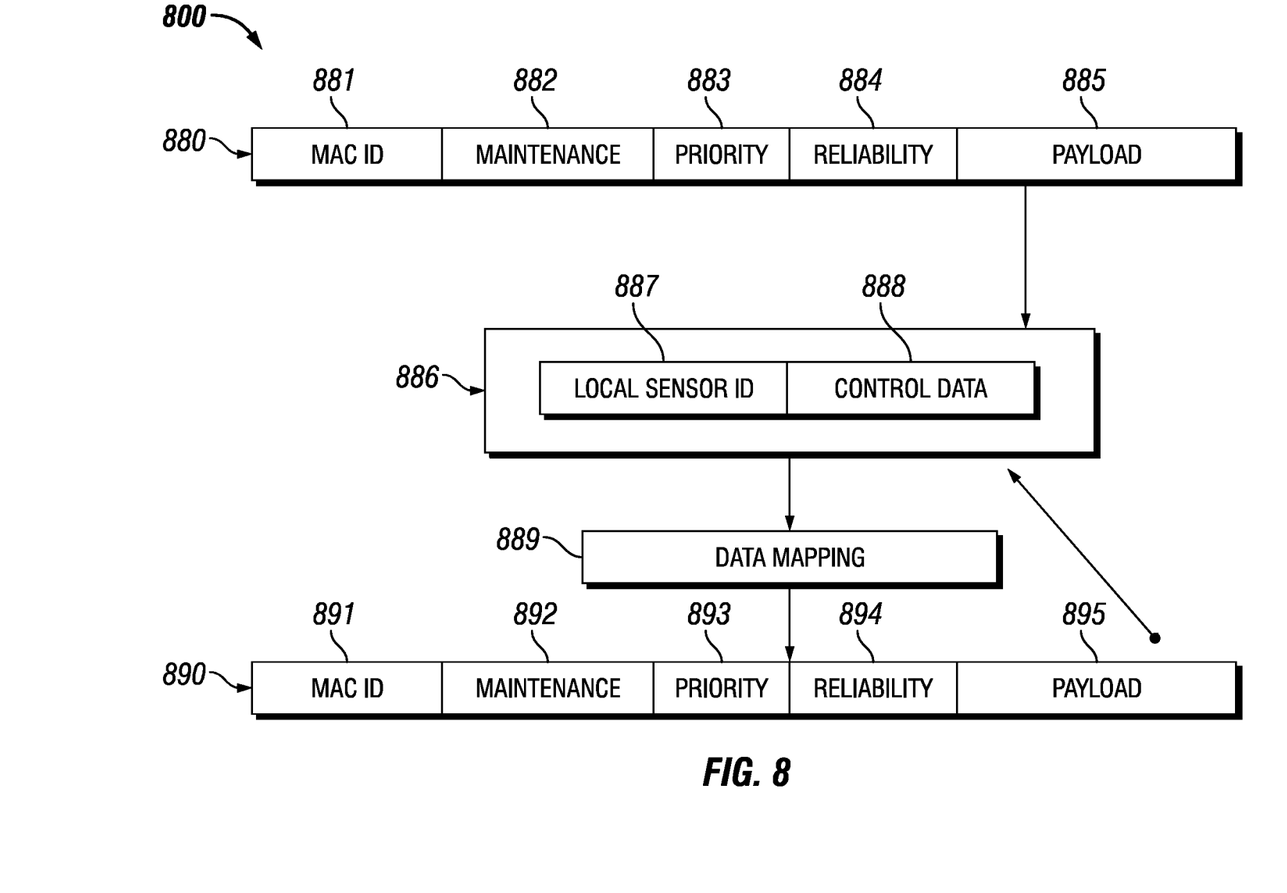
FIG. 8 shows network data frame architecture in accordance with certain example embodiments.

FIG. 8 shows a network data frame architecture 800 in accordance with certain example embodiments. As stated above, in certain example embodiments, the network manager is unaware of the existence of the sensors or any other devices to which the network manager is not directly communicably coupled. In this way, only the application software in a server and the controller in the light fixture is aware of the existence of the various sensors communicably coupled to the light fixture.

Referring to FIGS. 1-8, the network manager can communicate with a light fixture by generating and sending a data packet (e.g., data packet 880). A data packet can have any of a number of portions. For example, the data packet 880 of FIG. 8 can include an identification portion 881, a maintenance portion 882, a priority portion 883, a reliability portion 884, and a payload portion 885. Each of these portions can be populated (or in some cases, unpopulated) with data. The light fixture communicably coupled to the network manager includes a portion 886 of its controller that has a listing of local sensor IDs 887 and control data 888 associated with the various sensors communicably coupled to the light fixture.

When the light fixture receives the data packet, the controller of the light fixture can perform data mapping 889 to map the data in the data packet to the communication protocol understood by the sensor. This communication protocol can be the same as, or different than, the communication protocol used between the network manager and the light fixture. The resulting data packet 890 can be sent by the controller of the light fixture to the appropriate sensor.

Like the data packet 880 generated by the network manager, the data packet 890 can include any of a number of portions. For example, the data packet 890 of FIG. 8 can include an identification portion 891, a maintenance portion 892, a priority portion 893, a reliability portion 894, and a payload portion 895. Each of these portions can be populated (or in some cases, unpopulated) with data. The various portions of the data packet 890 can be the same as, or different than, the various portions of the data packet 880. The sensor can receive the data packet 890 in the desired format (e.g., HART) and send one or more data packets back to the light fixture in the same format. Subsequently, the light fixture can perform data mapping 889 to generate a data packet, using the data received from the sensor, and send the resulting data packet to the network manager. Example embodiments provide for light fixtures used as an access point in a communication network. Specifically, certain example embodiments allow for a controller of a light fixture to communicate with and control one or more sensors, located external to the light fixture, within a system. In some cases, example light fixtures can be located in particular environments (e.g., a hazardous environment). In such a case, the light fixture can comply with one or more applicable standards for that environment. Communication between the example light fixture and other components (e.g., a user, a sensor, a network manager) of the system can be conducted using wired and/or wireless technology.

By controlling the sensors, example embodiments can be used to put sensors in sleep mode when they are not in use. Example embodiments use one or more of a number of time-synchronized protocols for the transfer of data between the light fixture and the user, the network manager, and the sensors. Thus, example embodiments can result in lower power usage, as well as more efficient and secure communication between a light fixture and associated sensor devices, a user, and/or a network manager. When the light fixture is placed in a hazardous environment, a safety barrier disposed within the example light fixture can be used to improve safety practices and help ensure that the light fixture and/or the sensors comply with applicable standards for hazardous environments.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A lighting system, comprising:
   a plurality of light fixture components used in an operation of a plurality of light fixtures; and
   at least one controller that controls and communicates with the plurality of light fixture components,
   wherein the at least one controller, subsequent to initial operation of the plurality of light fixtures, is further communicably coupled with a first independent component, wherein the first independent component is unassociated with the operation of the plurality of light fixtures, wherein a first communication transmitted between the at least one controller and the first independent component comprises information that is unassociated with the operation of the plurality of light fixtures,
   wherein the first independent component, when introduced, is unknown to the at least one controller, and
   wherein the first independent component, after being introduced, is known to the at least one controller.

2. The lighting system of claim 1, further comprising:
   at least one sensor communicably coupled to the at least one controller, wherein the at least one sensor measures at least one parameter, wherein the first communication further includes the at least one parameter measured by the at least one sensor.

3. The lighting system of claim 2, further comprising:
   a power module that provides power to the at least one controller and the at least one sensor, wherein the power module comprises an energy storage device.

4. The lighting system of claim 3, wherein the power module enters a reduced power mode when the at least one controller is idle.

5. The lighting system of claim 3, further comprising:
   an additional power module disposed within a cavity formed by a housing of a light fixture of the plurality of light fixtures, wherein the additional power module supplies power to the at least one light fixture component.

6. The lighting system of claim 2, wherein the at least one sensor is among the plurality of light fixture components.

7. The lighting system of claim 2, wherein the at least one sensor is a second independent component.

8. The lighting system of claim 1, wherein the at least one controller comprises a wireless transceiver.

9. The lighting system of claim 1, wherein the at least one light fixture component is disposed within a housing of a light fixture of the plurality of light fixtures, wherein the housing meets applicable standards for a hazardous environment.

10. The lighting system of claim 9, further comprising:
    a safety barrier disposed within the housing, wherein the safety barrier is coupled to at least one electrical conductor that is coupled to another device outside the housing.

11. The lighting system of claim 1, wherein the at least one controller comprises:
    a hardware processor;
    memory comprising a plurality of instructions;
    a control engine that executes the plurality of instructions on the hardware processor to control and communicate with the at least one light fixture component and the first independent component unassociated with the operation of the plurality of light fixtures; and
    a communication module coupled to the control engine, wherein the communication module transfers communications between the control engine, the at least one light fixture component, and the first independent component unassociated with the operation of the plurality of light fixtures.

12. The lighting system of claim 11, wherein the communication module transfers the communications between the at least one controller and the first independent component unassociated with the operation of the plurality of light fixtures using at least one time-synchronized communication protocol.

13. The lighting system of claim 1, wherein the controller receives a second communication from a second independent component unassociated with the light fixture.

14. An electrical system, comprising:
    at least one independent component;
    a lighting system communicably coupled to the at least one independent component, wherein the lighting system comprises:
        at least one light fixture component used in operating a light fixture of the lighting system, wherein the light fixture is among a plurality of light fixtures; and
        a controller that controls and communicates with the at least one light fixture component,
        wherein the controller further communicates with the at least one independent component, wherein the at least one independent component is unassociated with the operation of the light fixture,
        wherein the at least one independent component, when introduced, is unknown to the plurality of controllers,
        wherein the at least one independent component, after being introduced, is known to the controller, and
        wherein communication signals transmitted between the controller and the at least one independent component are unassociated with the operation of the light fixture.

15. The electrical system of claim 14, wherein the controller is an access point with respect to the at least one independent component.

16. The electrical system of claim 14, further comprising:
    a network manager communicably coupled to the controller.

17. The electrical system of claim 16, wherein the network manager and the controller are part of a mesh communication network.

18. The electrical system of claim 17, wherein the network manager detects when the light fixture becomes unavailable and instructs another controller to initiate communication with the at least one independent component.

19. The electrical system of claim 14, wherein the light fixture and the at least one independent component are located in a hazardous environment.

20. The electrical system of claim 14, wherein signals are transferred between the controller and the at least one independent component using at least one time-synchronized protocol.

* * * * *